United States Patent
Niizato et al.

(10) Patent No.: US 7,761,086 B2
(45) Date of Patent: Jul. 20, 2010

(54) COMMUNICATION TERMINAL, SERVICE PROVIDING EQUIPMENT, COMMON SETUP INFORMATION MANAGEMENT EQUIPMENT, AND COMMUNICATION CONTROL METHOD

(75) Inventors: Noriko Niizato, Kawachinagano (JP);
Hiromi Himeno, Yokosuka (JP);
Kazufumi Yunoki, Yokosuka (JP);
Hiroyuki Hattori, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1276 days.

(21) Appl. No.: 10/422,698

(22) Filed: Apr. 25, 2003

(65) Prior Publication Data

US 2004/0017907 A1   Jan. 29, 2004

(30) Foreign Application Priority Data

Apr. 25, 2002   (JP) ............................ P2002-124483

(51) Int. Cl.
*H04M 3/42* (2006.01)

(52) U.S. Cl. ............... 455/414.1; 455/414.2; 455/417;
455/445; 455/461; 379/67.1; 379/165; 379/196;
379/201.01; 379/210.01; 379/211.01

(58) Field of Classification Search ............... 455/414.1,
455/414.2, 417, 445, 461; 379/67.1, 165,
379/196, 201.01, 210.01, 211.01
See application file for complete search history.

(56) References Cited

U.S. PATENT DOCUMENTS

| | | | |
|---|---|---|---|
| 4,723,273 A * | 2/1988 | Diesel et al. ........... | 379/211.02 |
| 4,975,941 A * | 12/1990 | Morganstein et al. .... | 379/88.23 |
| 5,930,700 A | 7/1999 | Pepper et al. | |
| 6,108,405 A * | 8/2000 | Luong ..................... | 379/93.11 |
| 6,983,245 B1 * | 1/2006 | Jimenez Felstrom et al. ..... | 704/238 |
| 7,197,124 B2 * | 3/2007 | Hutchinson, IV ...... | 379/201.01 |
| 2001/0044312 A1 * | 11/2001 | Yamane .................... | 455/456 |

FOREIGN PATENT DOCUMENTS

| | | |
|---|---|---|
| DE | 199 38 627 | 4/2001 |
| EP | 0 959 638 | 11/1999 |
| EP | 1 081 971 | 3/2001 |
| JP | 7-193648 | 7/1995 |
| WO | WO 93/26132 | 12/1993 |
| WO | WO 00/78086 | 12/2000 |

\* cited by examiner

*Primary Examiner*—Quynh H Nguyen
(74) *Attorney, Agent, or Firm*—Oblon, Spivak, McClelland, Maier & Neustadt, L.L.P.

(57) ABSTRACT

A communication terminal is provided including a plurality of service providing sections (terminal adaptation function, operation section) which terminates a call, accepts operation instruction information, and provides a predetermined information service, a DCF for managing the setup information, which is commonly set for the plurality of service providing sections and outputting control instruction information based on this setup information or operation instruction information, and a control section which controls operation of the plurality of service providing sections based on the control instruction information which is output from the DCF, are disposed, so that operation control of the plurality of service providing sections (e.g. startup of transfer/telephone answering machine) according to the common setup information or operation instruction information is implemented.

7 Claims, 9 Drawing Sheets

COMMUNICATION TERMINAL, SERVICE PROVIDING EQUIPMENT, COMMON SETUP INFORMATION MANAGEMENT EQUIPMENT, AND COMMUNICATION CONTROL METHOD

BACKGROUND OF THE INVENTION

1. Field of the Invention

The present invention relates to a communication terminal for transmitting/receiving information to/from a network, a service providing equipment for terminating a call, receiving operation instruction information and providing a predetermined information service, a common setup information management equipment for managing common setup information of a plurality of service providing sections, and a communication control method for controlling operation of the communication terminal or a communication system which comprises the communication terminal.

2. Related Background Art

As functions of communication terminals increase, users of communication terminals demand to operate communication terminals according to their intentions. For example, an increasing need is that a communication terminal is set to drive mode when driving a car so as to temporarily reject a response, or telephone numbers of an incoming call rejection target are preset in the address book so that an incoming call from these telephone numbers are rejected. By the way, "drive mode" means a mode in which any incoming call is rejected while driving a vehicle, in this patent specification.

Some communication terminals have a terminal adaptation function for terminating a call and providing a predetermined information service (e.g. voice communication, unrestricted digital communication, and packet communication), and a plurality of operation sections for accepting operation instruction information and providing a predetermined information service, but in prior art, user setup information, such as drive mode and incoming rejection setting, are individually managed by the terminal adaptation function in the communication terminal.

Therefore when a notify indication is sent to one terminal adaptation function (e.g. external terminal adaptation function) which does not manage the user setup information, and a notify indication is not sent to another terminal adaptation function which manages the user setup information due to a mismatch of bearers, the latter terminal adaptation function cannot transfer the user setup information to the control section of the communication terminal, and operation control of the communication terminal according to the user setup information (e.g. startup of transfer/telephone answering machine) cannot be implemented, which is a first problem.

Figure 9:
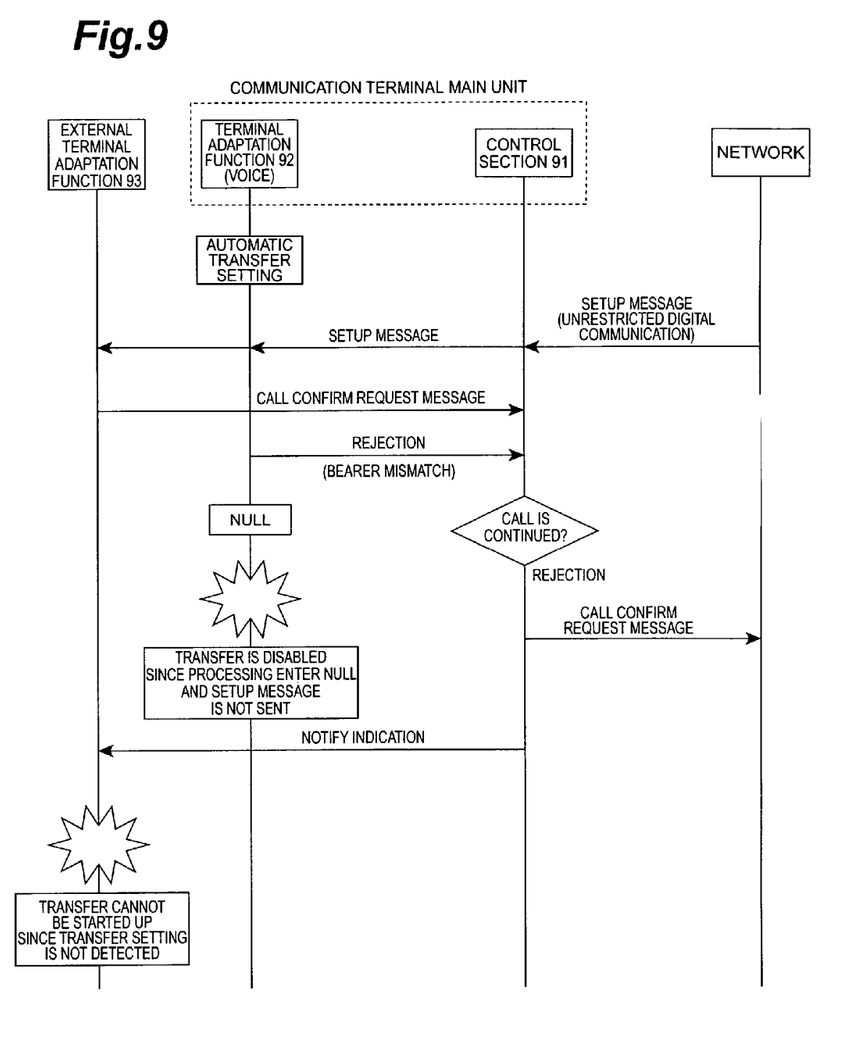
FIG. 9 is an operation transition diagram depicting the operation of prior art when the terminal adaptation function which holds the setup information cannot transfer the setup information to the control section.

In other words, as FIG. 9 shows, the terminal adaptation function 92 for supporting only voice calls holds the setup information of automatic transfer setting, but if the bearer of a setup message is an unrestricted digital communication, the rejection response (bearer mismatch) is returned to the control section 91 from the terminal adaptation function 92 since the terminal adaptation function 92 does not support "unrestricted digital communication", and a notify indication from the control section 91 is not sent to the adaptor 92. Therefore the terminal adaptation function 92 cannot transfer the setup information of the automatic transfer setting to the control section 91, and the external terminal adaptation function 93 is called up, but the external terminal adaptation function 93 does not know that a transfer setting has been set, so transfer cannot be started.

Just like above, there is a second problem where one terminal adaptation function in the communication terminal cannot transmit a correct cause value to the control section of the communication terminal and network because of a mismatch of the bearer, or there is a third problem where, when communication is in-progress in the external terminal adaptation function, termination of a call cannot be started up from the communication terminal main unit even if the user presses the on hook button.

With the foregoing in view, it is an object of the present invention to solve the above three problems and provide a communication terminal, service providing equipment, common setup information management equipment and communication control method for the user setup information to function effectively.

SUMMARY OF THE INVENTION

To achieve the above object the communication terminal according to the present invention is a communication terminal for transmitting/receiving information to/from a network, comprising a plurality of service providing sections for terminating a call, receiving operation instruction information and providing a predetermined information service, and a management control section for managing setup information on a service provision which is commonly set for the plurality of service providing sections, and controlling the operation of the plurality of service providing sections based on the setup information or operation instruction information.

The service providing section further comprises a terminal adaptation function for terminating a call and providing a predetermined information service, and an operation section for receiving operation instruction information and providing a predetermined information service.

The communication terminal comprising the plurality of service providing sections according to the present invention further comprises a specific configuration called a "management control section" for managing setup information which is commonly set for the plurality of service providing sections, and controlling operation of the plurality of service providing sections based on the setup information or operation instruction information, where common setup information is not managed by the terminal adaptation function, as in the prior art, but is managed by the management control section. This management control section controls operation of the plurality of service providing sections based on the common setup information or the operation instruction information, so operation control of the plurality of service providing sections according to the common setup information or the operation instruction information can be implemented.

Therefore the first problem where the setup information is not transferred to the control section and operation control according to the setup information (e.g. startup of transfer/telephone answering machine) cannot be implemented, the second problem where one terminal adaptation function cannot send a correct cause value to the control section and the network due to a bearer mismatch, and the third problem where termination of a call cannot be started from the communication terminal main unit when the external terminal adaptation function is in-communication, can be solved, and setup information by the user can function effectively.

An actual example of common setup information is the setup of drive mode, but it is preferable to enable/disable the setting according to the bearer, such as when the bearer is voice communication or audio/visual communication, the setting of drive mode is enabled, but when the bearer is an unrestricted digital communication, which assumes that a personal computer responds automatically, the setting of drive mode may be disabled.

Therefore it is preferable that the management control section judges whether the setup information is enabled for an incoming call based on both or one of the incoming information included in the setup message from the network and incoming time information, and common setup information, and controls operation of the plurality of service providing sections based on this judgment result. The incoming information in this patent specification is included in the setup message from the network, and for example, such bearer information as AV, AMR and UDI, and information on the originating number, are included. The incoming time information includes not only time information, hour and minute, but also the date information, specifying the year, month and day, which is obtained from the internal clock of the communication terminal, for example. In this case, whether the setup information should be enabled or not for an incoming call is appropriately judged based on both or one of the incoming information (e.g. bearer, originating number) and incoming time information, and operation of the plurality of service providing sections is controlled based on this judgment result, so appropriate operation control of the service providing sections matching the intention of the user with both or one of the incoming information and incoming time information, can be implemented.

In the control according to the incoming time, the setting to transfer to the telephone answering machine may be enabled in the night time zone from 23:00 to 7:00 the next morning, for example.

Various configurations may be used for the management control section of the present invention.

For example, the management control sections may be comprised of the common setup information management section for managing common setup information for the plurality of service providing sections, and a control section for controlling operation of the plurality of service providing sections, wherein the common setup information management section judges whether the setup information should be enabled for the incoming call based on both or one of the incoming information included in the setup message from the network and incoming time information, and the common setup information, notifies this judgment result to the control section as control instruction information, and the control section controls operation of the plurality of service providing sections based on this control instruction information.

The management control section may be comprised of the common setup information management section for managing the common setup information for the plurality of service providing sections, and the control section for controlling operation of the plurality of service providing sections, wherein the common setup information management section outputs the common setup information to the control section, and the control section judges whether the setup information should be enabled for the incoming call based on both or one of incoming information included in the setup message from the network and incoming time information, and the common setup information, and controls operation of the plurality of service providing sections based on this judgment result.

The judgment on whether the setup information should be enabled or not, may be shared by both the common setup information management section and control section. In other words, the management control section may be comprised of the common setup information management section for managing the common setup information for the plurality of service providing sections and the control section for controlling operation of the plurality of service providing sections, wherein the common setup information management section judges whether the setup information should be enabled for the incoming call based on the incoming time information and common setup information, outputs this judgment result and common setup information to the control section, the control section judges whether the setup information should be enabled for the incoming call based on the incoming information included in the setup message from the network and common setup information, and controls operation of the plurality of service providing sections based on this judgment result and the judgment result by the common setup information management section.

The common setup information is unitarily managed by the management control section as mentioned above, but in some cases, the user may want to set individual setup information for each service providing section.

So it is preferable that the service providing section can hold individual setup information for the service providing sections, and the management control section operates the service providing sections based on this individual setup information. In this case, one or a plurality of service providing sections holds individual setup information on the service providing sections, and the service providing sections are operated based on the individual setup information, so common setup information can be unitarily managed by the above mentioned common setup information management section, and operation control of the service providing sections based on the individual setup information can be implemented.

It is preferable that the service providing section can hold individual startup information on the service providing section, and outputs this individual setup information to a communication terminal which operates the service providing section. In this case, the service providing section holds the individual setup information on the service providing section, and outputs the individual setup information to the communication terminal, so that the communication terminal operates the service providing section based on this individual setup information, so the common setup information can manage the above mentioned common setup information section unitarily, and operation control of the service providing section based on the individual setup information can be implemented.

In the present invention, the service providing section may be included in the communication terminal, or may be configured as a service providing equipment, which is physically independent from the communication terminal.

In other words, the service providing equipment according to the present invention is a service providing equipment for terminating a call, receiving operation instruction information and providing a predetermined information service, wherein a communication system comprises a communication terminal for managing the setup information on a service provision which is commonly set for a plurality of service providing equipment, and controlling the operation of the plurality of service providing equipment based on the setup information or operation instruction information, and the plurality of service providing equipment, the service providing equipment can hold individual setup information on the service providing equipment, and outputs the individual setup information to the communication terminal which operates the service providing equipment.

In this case, the communication system is comprised of the communication terminal and a plurality of service providing equipment, the service providing equipment can hold individual setup information on this service providing equipment, and outputs the individual setup information to the communication terminal which operates the service providing equipment. And the communication terminal, which received the individual setup information from the service providing equipment, operates this service providing equipment based on the individual setup information. Therefore even if the service providing equipment is independent from the communication terminal in a configuration, operation control of the service providing equipment based on the individual setup information can be implemented.

In the present invention, the functions for managing the common setup information in the management control section of the communication terminal may be provided to the common setup information management equipment which is physically independent from the communication terminal.

In other words, the common setup information management equipment according to the present invention is common setup information management equipment which constitutes a communication system along with a communication terminal comprising a plurality of service providing sections for terminating a call, receiving operation instruction information and providing a predetermined information service, and a control system for controlling operation of the plurality of service providing sections based on the setup information on the service providing sections or the operation instruction information, wherein the common setup information management equipment manages the setup information on a service provision, which is commonly set for the plurality of service providing sections, judges whether the setup information should be enabled for an incoming call based on both or one of incoming information included in a setup message from the network and incoming time information, and on the above mentioned common setup information, and notifies the judgment result to the control section as control instruction information.

In this case, the common setup information management equipment constitutes the communication system along with the communication terminal, which comprises a plurality of service providing sections and a control section for controlling operation of the plurality of service providing sections. Here the common setup information management equipment manages the setup information on the service provision which is commonly set for the plurality of service providing sections, judges whether the setup information should be enabled for an incoming call based on both or one of the incoming information included in the setup message from the network and incoming time information, and common setup information, and notifies the judgment result to the control section of the communication terminal as the control instruction information.

In this way, whether the setup information should be enabled for an incoming call is appropriately judged according to both or one of the incoming information and incoming time information, and this judgment result is notified to the control section of the communication terminal as control instruction information, so appropriate operation control of the service providing section matching the intention of the user, including incoming information and incoming time information, can be implemented.

The present invention can be understood as an invention of a communication control method for controlling operation of a communication terminal or a communication system comprising thereof, which exhibits the same functions and effects. In other words, the present invention can be described as follows.

The communication method according to the present invention is a communication control method for controlling operation of a communication system which comprises a plurality of service providing sections for terminating a call, receiving operation instruction information and providing a predetermined information service, and transmits/receives information to/from a network, wherein setup information on the service provision, which is commonly set for the plurality of service providing sections, is unitarily managed, and operation of the plurality of service providing sections is controlled based on the setup information or operation instruction information.

Here it is assumed that the communication system includes a communication system comprised of a communication terminal alone, a communication system comprised of a communication terminal and independent service providing sections, or a communication system comprised of a communication terminal and independent common setup information management section.

In the communication control method according to the present invention, it is preferable that whether the setup in formation should be enabled for an incoming call is judged based on both or one of the incoming information included in the setup message from the network and incoming time information, and the above mentioned common setup information, in the operation control of the plurality of service providing sections, and operation of the plurality of service providing sections is controlled based on this judgment result.

In the communication control method according to the present invention, it is preferable that the service providing section can hold the individual setup information on the service providing sections and the service providing section is operated based on this individual setup information.

The present invention can be applied to call control in general, including a packet switching system and circuit switching system.

DESCRIPTION OF THE PREFERRED EMBODIMENTS

An embodiment of the communication terminal and communication control method according to the present invention will now be described.

[Configuration of Communication Terminal]

Figure 1:
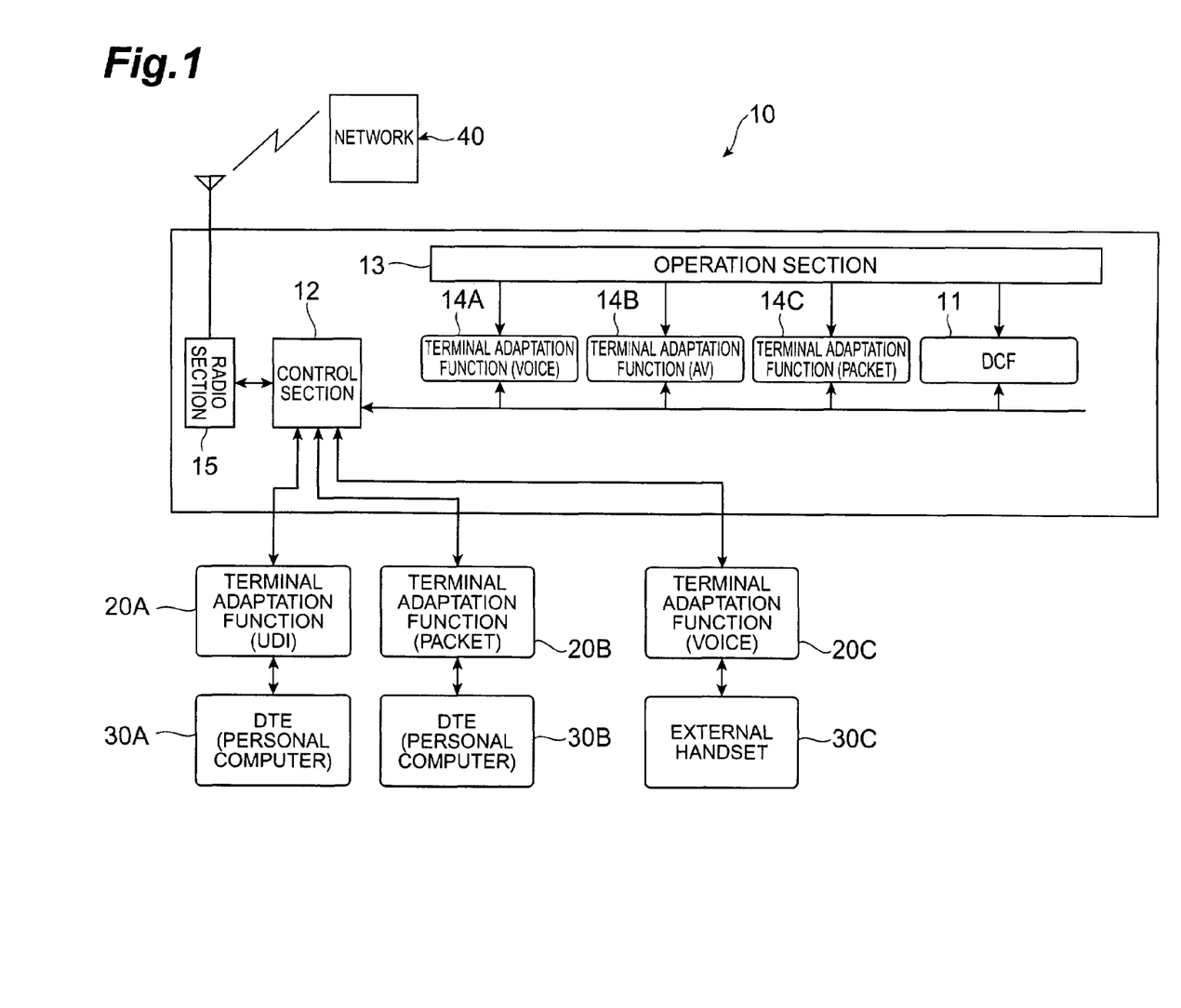
FIG. 1 is a functional block diagram depicting a configuration of the communication terminal according to an embodiment of the present invention.

The configuration of the communication terminal will be described first. As FIG. 1 shows, the communication terminal 10 comprises a control section 12 for monitoring and controlling the operation of each section of the communication terminal 10, an operation section 13 for receiving user operation information (that is, operation instruction information) such as setup and call termination and providing a service according to this operation, terminal adaptation functions 14A, 14B and 14C (hereafter collectively called "terminal adaptation function 14") for terminating a call and providing a predetermined information service, and a device control function (DCF) 11 for managing setup information by the user which is commonly set for the terminal adaptation function 14 and later mentioned external terminal adaptation functions 20A, 20B and 20C, and notifying the setup information or control instruction information based on the user operation from the operation section 13 to the control section 12. The communication terminal 10 comprises a radio section 15 for controlling radio communication and can be connected with the network 40 from the radio section 15 via radio communication. The communication terminal 10 can be configured by a cellular phone, for example, and in this case, the communication terminal 10 can be configured so as to be connectable with the mobile communication network as the network 40 via a base station which is not illustrated.

The external terminal adaptation functions 20A, 20B and 20C can be connected to the communication terminal 10, and DTEs (e.g. personal computer) 30A and 30B can be connected to the terminal adaptation functions 20A and 20B, and the external handset 30C can be connected to the terminal adaptation function 20C respectively. These external terminal adaptation functions 20A, 20B and 20C have functions to terminate a call and provide a predetermined information service, just like the above mentioned terminal adaptation function 14, so these external terminal adaptation functions are collectively called the "external terminal adaptation function 20" hereafter.

Each one of the terminal adaptation function 14 and external adapter section 20 can provide (support) for one or more service, and, for example, the terminal adaptation functions 14A and 20C can provide (support) for a voice communication (call) service, the adaptor 14B can provide (support) for an audio/visual communication (hereafter "AV communication") service, the adaptor 14C can provide (support) for a packet communication service (e.g. simplified Internet service), the adaptor 20A can provide (support) for UDI (Unrestricted Digital Information), and the adaptor 20B can provide (support) for a packet communication service respectively.

The present invention is characterized in that DCF 11 is installed in the communication terminal 10. This DCF 11 judges whether the setup information should be enabled for incoming calls based on the incoming information (e.g. bearer information, originating number information) included in the setup message from the network 40, incoming time information (e.g. incoming time information managed by DCF 11) and common setup information, and notifies this judgment result to the control section 12 as control instruction information. Details of the operation will be described later.

Each one of the terminal adaptation function 14 and the external terminal adaptation function 20 can hold individual setup information, and the control section 12 allows the terminal adaptation function 14 or external terminal adaptation function 20 which holds the individual information to operate based on this individual setup information. The details of the operation will be described later.

[Operation of Communication Terminal]

Operation of the communication terminal 10 will now be described. Here operation of the communication terminal 10 will be described in sequence for five aspects. In other words, the five aspects are (1) incoming call rejection 1 (based on drive mode and bearer specification), (2) incoming call rejection 2 (incoming call rejection/acceptance based on the transmission origination telephone number, (3) telephone answering machine transfer/transfer telephone, (4) disconnection, and (5) operation based on the setup information held by the external terminal adaptation function.

Figure 2:
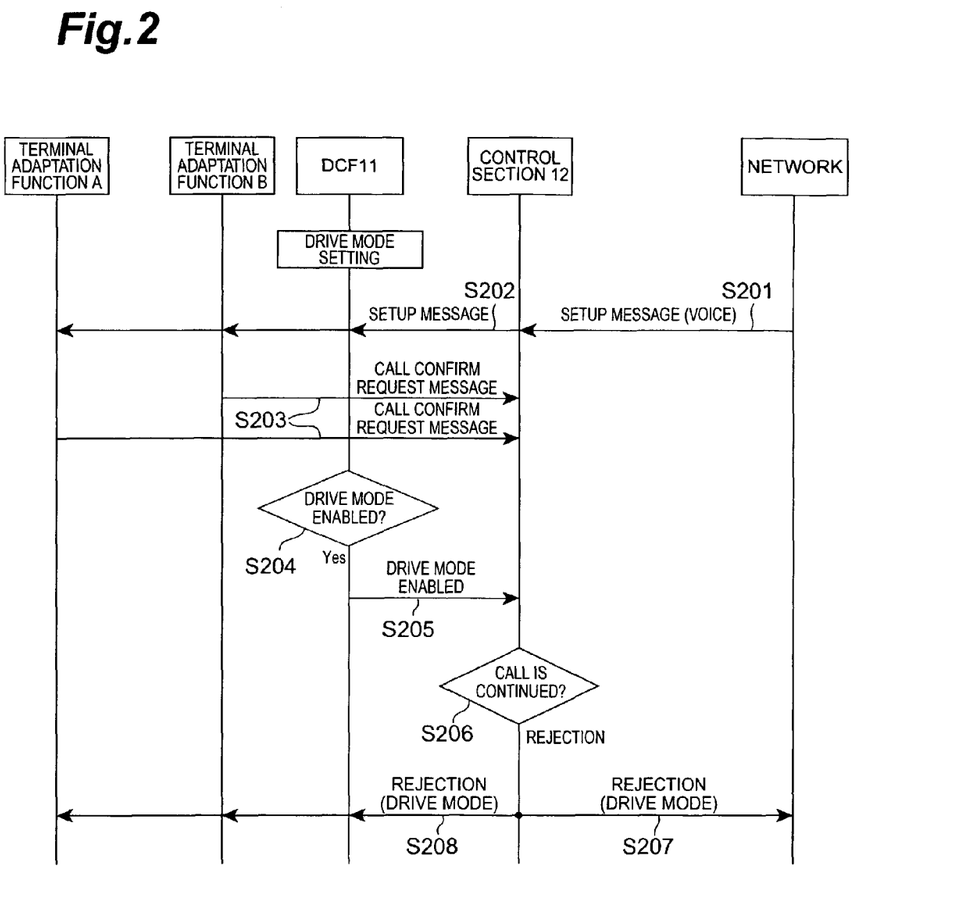
FIG. 2 is an operation transition diagram depicting a series of operations when the communication terminal rejects an incoming call by setting the drive mode.
Figure 3:
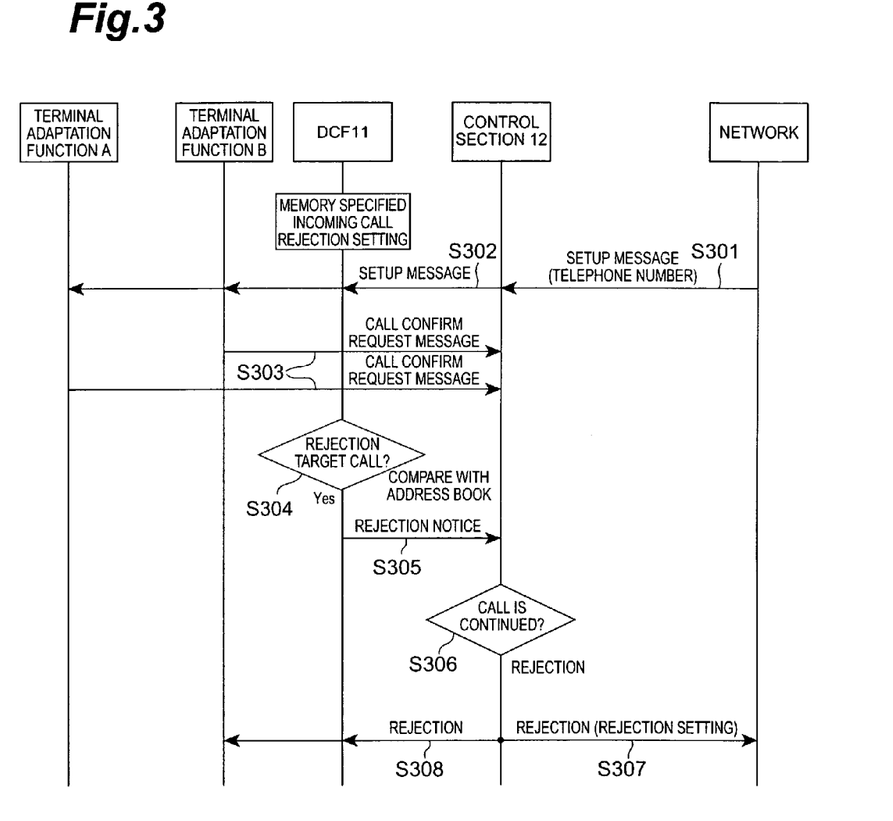
FIG. 3 is an operation transition diagram depicting a series of operations when the communication terminal rejects an incoming call by setting the incoming call rejection number.
Figure 4:
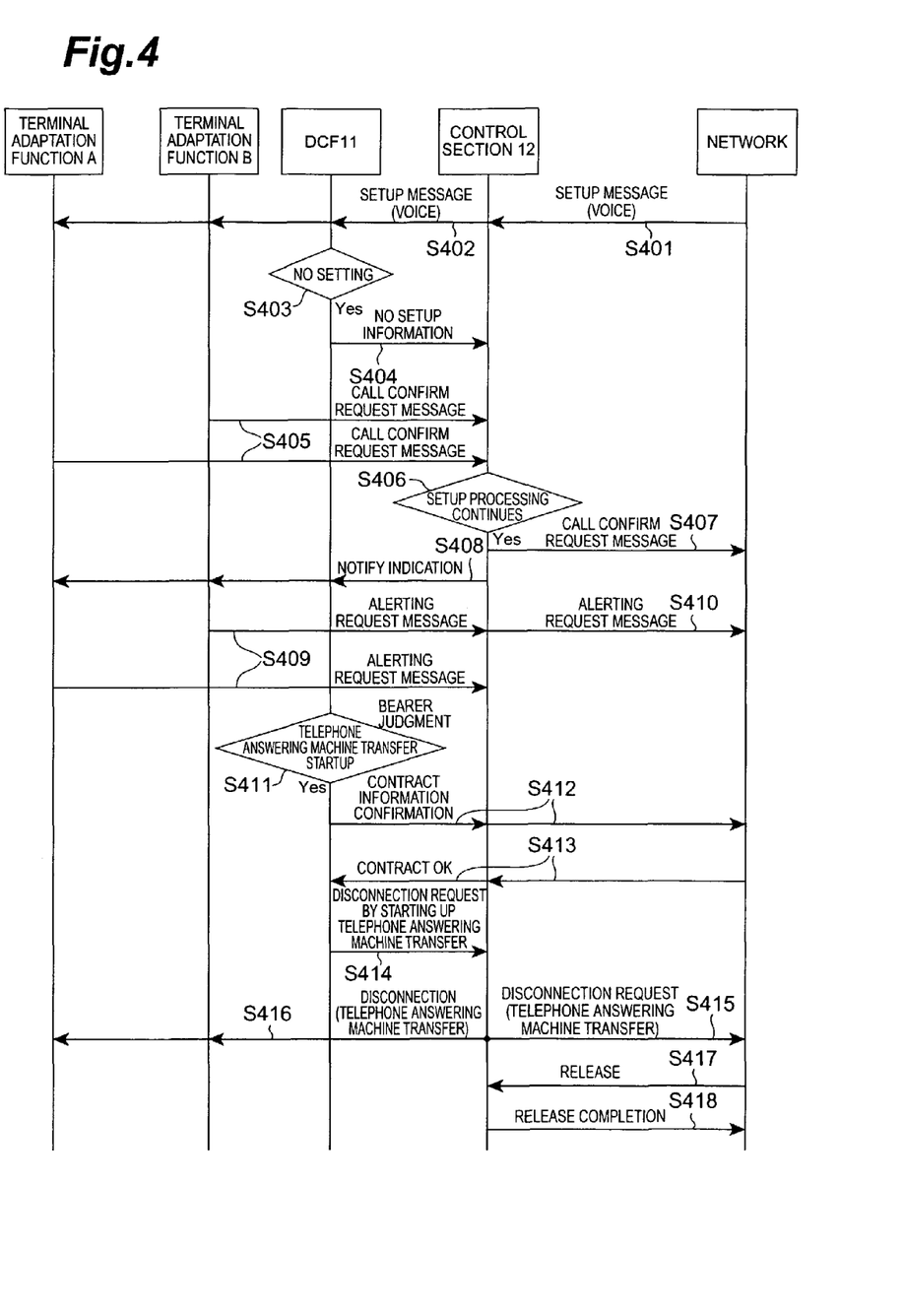
FIG. 4 is an operation transition diagram depicting a series of operations when the communication terminal starts up the telephone answering machine transfer.

In the transition diagrams in FIG. 2 to FIG. 4, which will be used for the following description, the terminal adaptation functions A and B refer to any two of the terminal adaptation function 14 and external terminal adaptation function 20, and the difference between the internal terminal adaptation function 14 and external terminal adaptation function 20 is not distinguished in the communication terminal 10.

[Operation of Communication Terminal [1] (Incoming Call Rejection 1: Based on Drive Mode and Bearer Specification)]

At first, the operation of incoming call rejection by the drive mode setup will be described with reference to FIG. 2. It is assumed that the DCF 11 holds the drive mode setup as the setup information.

When the communication terminal 10 receives the setup message where "voice communication" is setup as the bearer information, out of the incoming information (S201), the control section 12 transfers the setup message to the DCF 11 and the terminal adaptation functions A and B (S202). Here the terminal adaptation functions A and B recognize the bearer "voice communication" included in the setup message, and if voice communication can be supported, the terminal adaptation functions A and B respond with the signal of the call confirm request message to the control section 12 (S203).

The DCF 11, on the other hand, judges whether drive mode is enabled (S204), and if the drive mode has been set in advance, as in this example, the DCF 11 notifies the control instruction information indicating that drive mode is enabled, to the control section 12 (S205).

The control section 12 judges whether a call will be continued (S206). Here the control section 12, which received the signal of the call confirm request message from the terminal adaptation functions A and B but also received the control instruction information which indicates that drive mode is enabled from the DCF 11, judges that the call should be rejected in S206, returns a response to reject the call because drive mode is set to the network (S207), notifies rejection of the call because drive mode is set to the DCF 11 and the terminal adaptation functions A and B (S208), and terminates processing.

By such processing, the drive mode setup information which the DCF 11 unitarily manages is transferred to the control section 12, drive mode setup functions effectively, and an incoming call is rejected.

Just like above, setup to execute incoming call rejection with specifying a predetermined bearer can be implemented. For example, the following control is possible such that drive mode is enabled when the bearer is voice communication and AV communication, and drive mode is disabled and a call is accepted when the bearer is unrestricted digital communication (UDI). In other words, when DCF 11 judges that the bearer of a setup message is unrestricted digital communication, the control instruction information to notify that drive mode is disabled is notified to the control section 12, even if drive mode is set.

For the case when an incoming call is to be rejected only during communication (second incoming call rejection), the DCF 11 judges that the call is an incoming call during communication, and implements call rejection by sending the control instruction information to notify that an incoming call should be rejected, to the control section 12.

[Operation of Communication Terminal (2) (Incoming Call Rejection 2: Incoming Call Rejection/Acceptance Based on Transmission Origination Telephone Number)]

Now operation of incoming call rejection by a predetermined telephone number setting will be described with reference to FIG. 3. It is assumed that the DCF 11 holds the address book information where incoming call rejection target telephone numbers are stored and the setup information of the memory-specified incoming call rejection, as the setup information.

When the communication terminal 10 receives the setup message, including transmission side telephone number information where "voice communication" is set as bearer information, from the network (S301), the control section 12 transfers the setup message to the DCF 11 and terminal adaptation functions A and B (S302). Here the terminal adaptation functions A and B recognize the bearer "voice communication" included in the setup message, and respond with a signal call confirm request message to the control section 12 if voice communication can be supported (S303).

The DCF 11, on the other hand, judges whether this call is a rejection target call or not by collating the transmission side telephone number of the call and the telephone numbers in the address book (S304). Here, if the transmission side telephone number has been registered in the address book and this transmission side telephone number has been set for rejection, the DCF 11 notifies the control instruction information to reject the incoming call to the control section 12 (S305). The DCF 11 may judge whether the call is a rejection target call by creating a rejection list where only transmission side telephone numbers from which an incoming call is rejected are registered in the address book, and the DCF 11 refers to this rejection list.

And the control section 12 judges whether the call will be continued or not (S306). Here the control section 12, which received the signal of the call confirm request message from the terminal adaptation functions A and B but also received the control instruction information to reject the incoming call from the DCF 11, judges that the call should be rejected in S306, returns the response to reject the call since incoming call rejection targets have been set (S307), notifies DCF 11 and terminal adaptation functions A and B that the call was rejected since incoming call rejection is set (S308), and terminates the processing.

By such processing, the address book information of the telephone numbers from which an incoming call is rejected and the setup of the memory-specified incoming call rejection, which DCF 11 unitarily manages, function effectively, and an incoming call is rejected.

FIG. 3 shows an example of rejecting an incoming call, but if the transmission side telephone number is not registered in the address book, the DCF 11 judges that this call is not a rejection target call, and notifies the control instruction information to indicate that this call is not an incoming call rejection target to the control section 12. The control section 12 judges that the call is continued, and the incoming call is accepted.

[Operation of Communication Terminal [3] (Telephone Answering Machine Transfer/Transfer Telephone)]

Now the operation to judge a predetermined bearer and startup telephone answering machine transfer, regardless the terminal adaptation function to which the call comes in, will be described with reference to FIG. 4. Here it is assumed, for example, that the DCF 11 holds the setup information to startup telephone answering machine transfer only when the bearer is voice communication as the setup information.

When the communication terminal 10 receives a setup message where "voice communication" is set as the bearer information from the network (S401), the control section 12 transfers the setup message to the DCF 11 and terminal adaptation functions A and B (S402). In this stage, whether telephone answering machine transfer startup has been set is not judged, so the DCF 11 judges as "No setup information" (S403), and responds to the control section 12 that there is no setup information (S404). And the terminal adaptation functions A and B recognize the bearer "voice communication" included in the setup message, and if voice communication can be supported, the terminal adaptation functions A and B respond with the signal of the call confirm request message to the control section 12 (S405).

The control section 12, which received these responses, judges that the setup processing is continued (S406), and responds with the signal of the call confirm request message to the network (S407). And the control section 12 transmits the notify indication signal to the DCF 11 and terminal adaptation functions A and B (S408), and when this is responded to by an alerting request message from the terminal adaptation function (S409), the control section 12 transmits the alerting request message to the network (S410). In the stage of an alerting request, whether the telephone answering machine transfer startup has been set is judged. In other words, the DCF 11 judges whether some setup or telephone answering machine transfer or transfer telephone has been made. (S411). Here the bearer of this call is voice communication, so it is judged that the telephone answering machine transfer is started up, and the DCF 11 confirms to the management server (not illustrated) of the contracted information on the network via the control section 12 that the telephone answering machine transfer has been registered as the contract information of the communication terminal 10 (S412). Here telephone answering machine transfer has been registered as the contract information of the communication terminal 10, so a response to indicate no problem (contract OK) is sent to the DCF 11 as the contract information (S413).

The DCF 11, which received this, executes a disconnection request to the control section 12 by the startup of the telephone answering machine transfer (S414), the control section 12 sends a disconnection request to the network because of the telephone answering machine transfer (S415), executes disconnection processing to the terminal adaptation functions A and B because of the telephone answering machine transfer (S416), and executes call release processing (S417, S418).

By such processing, automatic operation control based on the setup information which the DCF 11 unitarily manages (starting up the telephone answering machine transfer only when the bearer is voice communication) is implemented.

FIG. 4 shows an example when telephone answering machine transfer is executed based on the setup information of the user, but the above processing can be applied as well when transfer telephone is started up and when the DCF 11 starts up various transfers by user operation, regardless the incoming adaptor.

[Operation of Communication Terminal (4) (Disconnection)]

Figure 5:
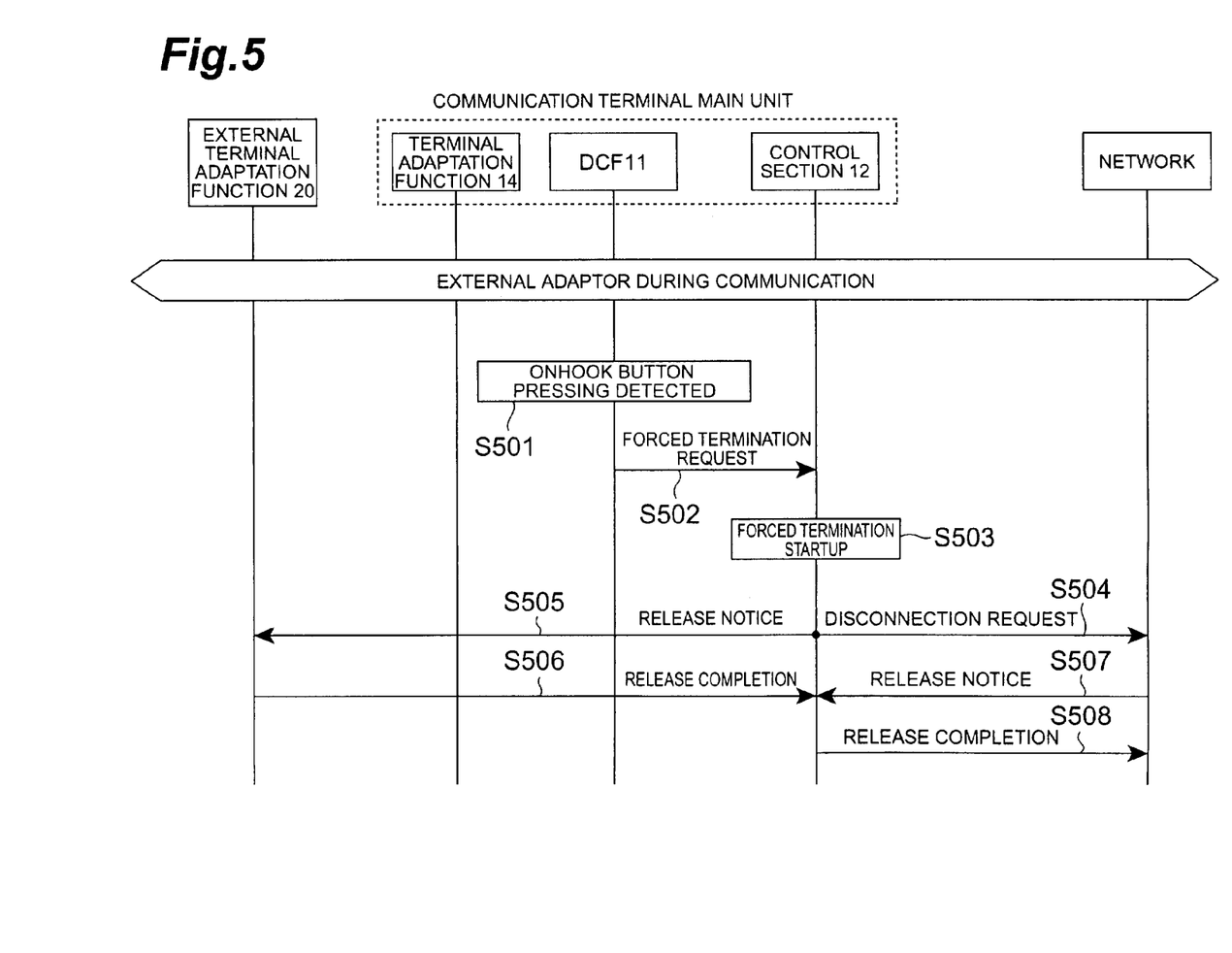
FIG. 5 is an operation transition diagram depicting a series of operations when the communication terminal starts up disconnection.

Now operation to startup forced termination will be described with reference to FIG. 5. As FIG. 5 shows, it is assumed that the external terminal adaptation function 20 is in-communication. If the user presses the operation part 13 (e.g. on hook button) to terminate communication in this status, the DCF 11 detects the pressing of the on hook button (S501), and requests a forced termination to the control section 12 (S502).

The control section 12, which received this request, starts up forced termination (S503), and executes call release processing to the external terminal adaptation function 20 and network which are in-communication (S504-S508).

By this processing, the DCF 11 which detected the pressing of the on hook button requests forced termination to the control section 12, even if the external terminal adaptation function 20 is in-communication, so the conventional problem where call termination cannot be started up from the communication terminal main unit when the external terminal adaptation function is in-communication can be avoided, and appropriate operation control according to the user operation can be implemented.

FIG. 5 shows an example when the external terminal adaptation function 20 is in-communication, but for the operation to startup forced termination when the terminal adaptation function 14 in the communication terminal is in-communication as well, appropriate operation control according to the user operation can be implemented by requesting forced termination to the control section 12 by the DCF 11 which detected pressing of the on hook button.

[Operation of Communication Terminal (5) (Operation Based on the Setup Information held by the External Terminal Adaptation Function )]

In the communication terminal 10, each one of the terminal adaptation function 14 and external terminal adaptation function 20 can hold individual setup information, and control section 12 allows the terminal adaptation function 14 or external terminal adaptation function 20 which holds the individual setup information to operate based on the individual setup information. This operation will now be described with reference to FIG. 6 to FIG. 7.

Figure 6:
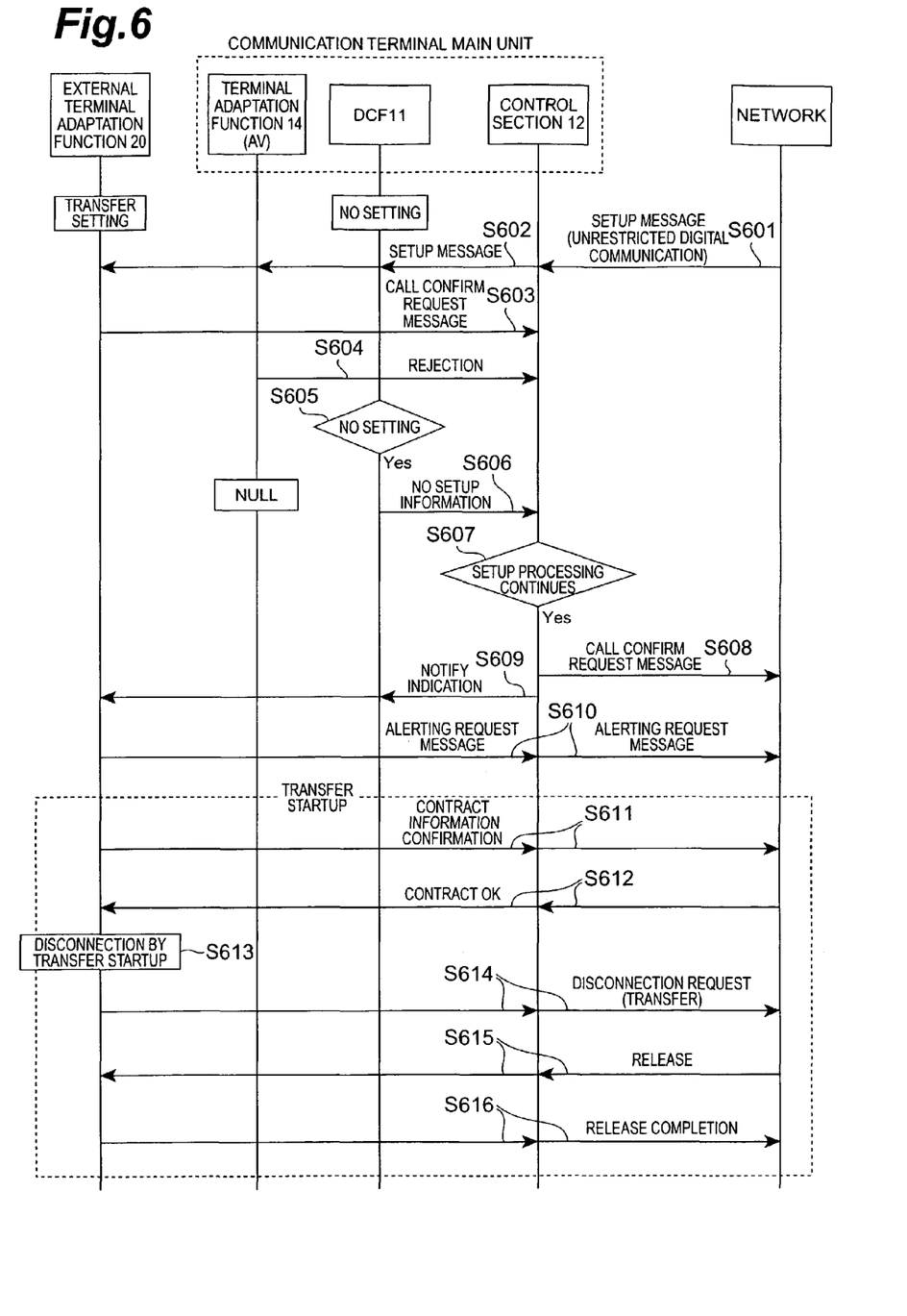
FIG. 6 is an operation transition diagram when the external terminal adaptation function which holds the setup information responds to an incoming call.

FIG. 6 shows operation when the incoming call is responded to not by the terminal adaptation function 14 in the communication terminal but by the external terminal adaptation function 20. It is assumed that the DCF 11 does not hold the setup information, but the external terminal adaptation function 20 holds the setup of the transfers of all services as individual setup information.

When the communication terminal 10 receives the setup message where "unrestricted digital communication" is set as bearer information from the network (S601), the control section 12 transfers the setup message to the DCF 11, terminal adaptation function 14 and external terminal adaptation function 20 (S602) Here the external terminal adaptation function 20 recognizes the bearer "unrestricted digital communication" included in the setup message, and responds with the signal of the call confirm request message to the control section 12 if unrestricted digital communication can be supported (S603). Whereas the terminal adaptation function 14, which can support only AV communication, responds with a rejection signal to the control section 12 (S604). The DCF 11 judges that setup information does not exist (S605), and responds to the control section 12 that the setup information does not exist (S606).

The control section 12 judges that the setup processing should be continued by the response in S603-S606 (S607), and responds with the signal of the call confirm request message to the network (S608). And the control section 12 transmits the notify indication signal to the DCF 11 and external terminal adaptation function 20 (S609), and if the external terminal adaptation function 20 responds with an alerting request message to this, the control section 12 transmits the alerting request message to the network (S610).

By this, it is decided that the external terminal adaptation function 20 responds to the incoming call, so transfer startup operation based on the individual setup information of the external terminal adaptation function 20 is executed according to the following procedure. In other words, the external terminal adaptation function 20 confirms that transfer has been registered as the contract information of the communication terminal 10 for the management server (not illustrated) in the contract information on the network via the control section 12 (S611). Here transfer has been registered as contract information of the communication terminal 10, so a message to indicate that there is no problem (contract OK) is responded to the external terminal adaptation function 20 as the contract information (S612).

The external terminal adaptation function 20 disconnects by transfer startup (S613), executes the disconnection request because of transfer to the network via the control section 12 (S614), and executes call release processing (S615, S616).

By this processing, transfer operation is executed based on the individual setup information of the external terminal adaptation function 20.

Figure 7:
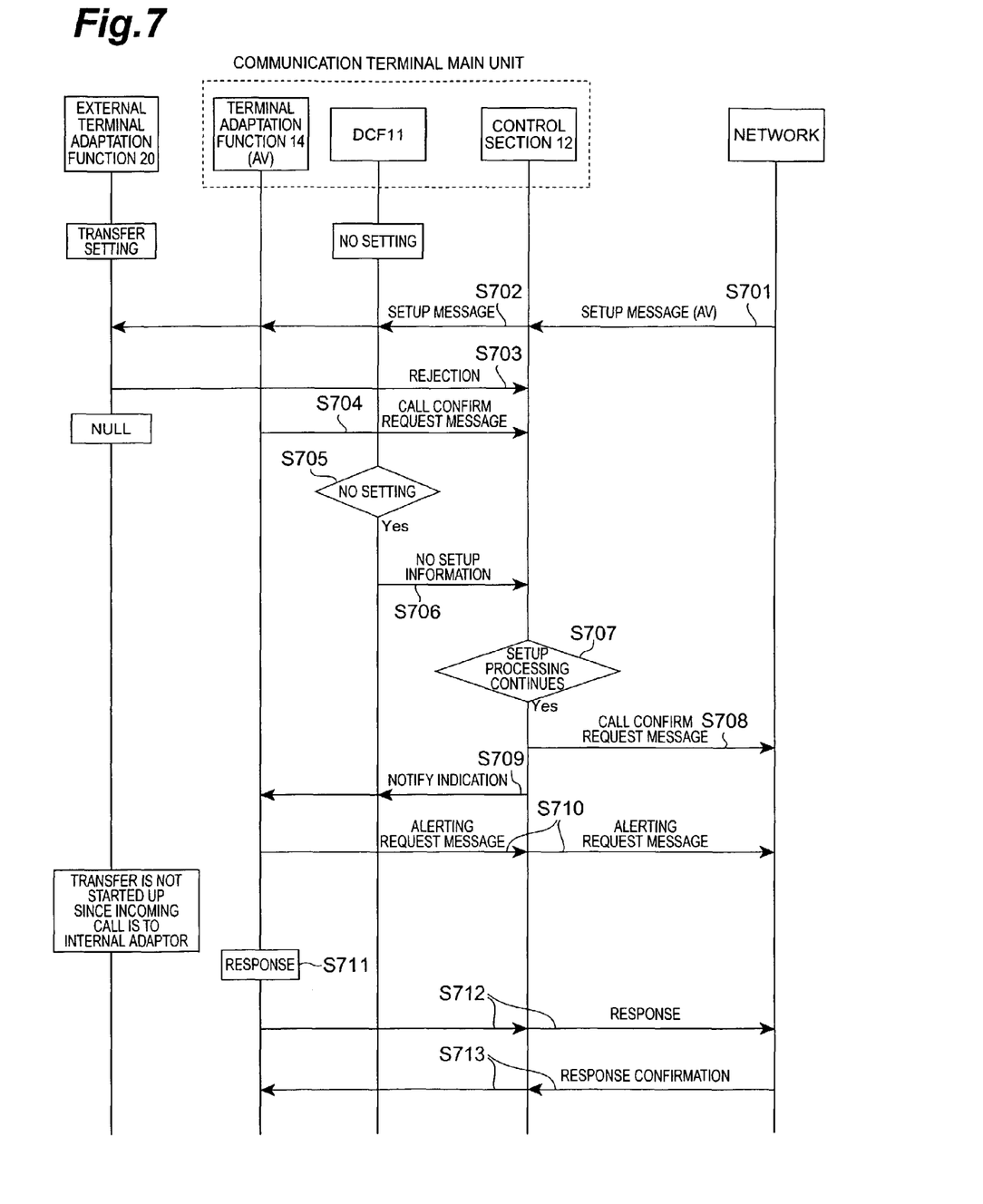
FIG. 7 is an operation transition diagram depicting a series of operations when a terminal adaptation function other than the external terminal adaptation function which holds the setup information responds to an incoming call.

FIG. 7, on the other hand, shows operation when the incoming call is responded to not by the external terminal adaptation function 20 but by the terminal adaptation function 14 in the communication terminal. It is assumed that the DCF 11 does not hold the setup information, but the external terminal adaptation function 20 supports only unrestricted digital communication and holds the setting of a transfer for the unrestricted digital communication as individual setup information.

When the communication terminal 10 receives the setup message where "AV communication" is set as bearer information from the network (S701), the control section 12 transfers the setup message to the DCF 11, terminal adaptation function 14 and external terminal adaptation function 20 (S702). Here the external terminal adaptation function 20 recognizes the bearer "AV communication" included in the setup message, and responds with the rejection signal to the control section 12 since the external terminal adaptation function 20 cannot support AV communication (S703). The terminal adaptation function 14, which can support AV communication, on the other hand, responds with the signal of the call confirm request message to the control section 12 (S704). The DCF 11 judges that setup information does not exist (S705), and responds to the control section 12 that setup information does not exist (S706).

The control section 12 judges that the setup processing should be continued by the response in S703-S706 (S707), and responds with the signal of the call confirm request message to the network (S708). And the control section 12 transmits the notify indication signal to the DCF 11 and terminal adaptation function 14 (S709), and when the terminal adaptation function 14 responds with an alerting request message to this, the control section 12 transmits the alerting request message to the network (S710).

By this, the terminal adaptation function 14 transmits the response signal to the network via the control section 12 by the user who responds (S711, S712), and receives the response confirmation signal from the network via the control section 12 (S713).

As FIG. 6 and FIG. 7 show, each one of the terminal adaptation function 14 and external terminal adaptation function 20 can hold individual setup information, and the terminal adaptation function 14 or external terminal adaptation function 20 which holds the individual setup information can start up operation based on the individual setup information. By this, while common setup information is unitarily managed by the DCF 11, respective operation control of the terminal adaptation function 14 and external terminal adaptation function 20 based on the individual setup information can be implemented.

The above description shows an example where the DCF 11 judges whether the setup information is enabled, but a configuration where the control section 12 performs this judgment may be used. Now an embodiment where the control section 12 performs this judgment will be described with reference to FIG. 8, using the operation of [1] incoming call rejection 1 (based on drive mode and bearer specification) as an example. Here it is assumed that the DCF 11 holds the drive mode setting as the setup information.

When the communication terminal 10 receives the setup message where "voice communication" is set as the bearer information from the network (S801 in FIG. 8), the control section 12 transfers the setup message to the DCF 11 and terminal adaptation functions A and B (S802). Here the terminal adaptation functions A and B recognize the bearer "voice communication" included in the setup message, and respond with the signal of the call confirm request message to the control section 12 if voice communication can be supported (S803).

Figure 8:
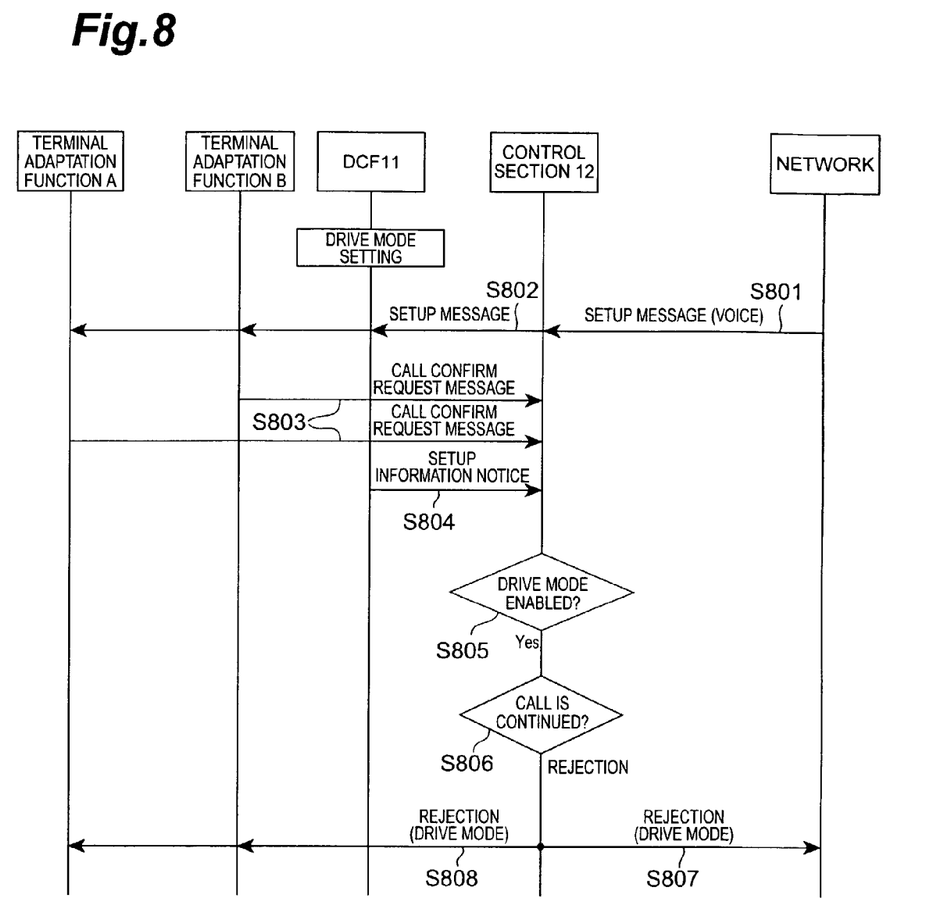
FIG. 8 is an operation transition diagram depicting a series of operations when the control section judges whether the setup information should be enabled for an incoming call.

The DCF 11, on the other hand, notifies the setup information where drive mode is set to the control section 12 (S804). The control section 12, which received this notice, judges whether the drive mode is enabled (S805). If the drive mode has been set in advance as the setup information, as in this example, the control section 12 judges that the drive mode is enabled in S805, and judges whether the call is continued (S806). Here the control section 12, which received the signal of the call confirm request message from the terminal adaptation functions A and B, judged that drive mode is enabled, so the control section 12 judges to reject the call in S806, returns the response to reject to the call because drive mode is set, to the network (S807), notifies the terminal adaptation functions A and B that the call is rejected because drive mode is set (S808), and terminates processing.

By this processing, the drive mode setup information which the DCF 11 unitarily manages is notified to the control section 12 and the control section 12, judges that the drive mode setting is enabled, and as a result the drive mode setup functions effectively and the incoming call is rejected.

In the above embodiment, an example where the present invention is applied to a circuit switching type call control was described as an example of call control, but the present invention can be applied to call control in general, including a packet switching type.

The control section 12 may judge whether the setup information should be enabled for an incoming call, based on the incoming information, such as information of the call origination number and incoming time information managed by the DCF 11, rather than a match/mismatch of bearers. In the case of control based on the incoming time, setup to transfer the call to the telephone answering machine may be enabled in the night time zone, from 23:00 to 7:00 the next morning, for example.

The judgment whether the setup information should be enabled for the incoming call may be shared by the DCF 11 and the control section 12 according to the information on which the judgment depends. For example, the control section 12 may judge based on the incoming information, such as the information of the bearer and call origination number, and the DCF 11 may judge based on the incoming time.

In the above embodiment, a configuration example where the communication terminal 10 encloses the terminal adaptation function 14 and the DCF 11 was described, but the terminal adaptation function 14 and the DCF 11 may be physically independent from the communication terminal 10 respectively. In other words, the present invention exhibits the same functions and effects whether the terminal adaptation function 14 or the DCF 11 is enclosed in the communication terminal 10 or is physically independent.

As described above, according to the present invention, operation control of a plurality of service providing sections according to a common setup information or operation instruction information is implemented, so the first problem where the setup information is not transferred to the control section and operation control according to this setup information (e.g. startup of transfer/telephone answering machine) cannot be implemented, the second problem where one terminal adaptation function which has bearer mismatch cannot transmit the correct cause value to the control section and network, and the third problem where startup of incoming call rejection and startup of call termination cannot be executed during communication, can be solved, and setup information by the user can function effectively.

What is claimed is:

1. A communication terminal for transmitting/receiving information to/from a network, comprising:

a plurality of service providing sections configured to terminate a call, to receive operation instruction information and to provide a predetermined information service; and a management control section that is resident in the terminal and configured to manage setup information on a service provision, the setup information including an enablement and disablement of a drive mode by a user operation of the communication terminal, and configured to control operation of said plurality of service providing sections based on said setup information and operation instruction information, wherein said management control section is configured to manage said setup information, the setup information including information indicating how to control the service providing sections disposed inside the communication terminal and information indicating how to control said service providing sections disposed outside the communication terminal that are connected to the communication terminal, and when the drive mode is enabled, the management control section selectively rejects an incoming voice call while accepting incoming data calls based on incoming information from the network identifying the incoming call as one of a voice call and a data call, the management control section accepting the incoming data calls using said service providing sections disposed outside the communication terminal, the communication terminal transmitting a call rejection notification to the network when the incoming voice call is rejected.

2. The communication terminal according to claim 1, wherein said management control section judges whether the setup information should be enabled for an incoming call based on the incoming information included in a setup message from the network, incoming time information, and on said common setup information, and controls operation of said plurality of service providing sections based on the judgment result.

3. The communication terminal according to claim 1, wherein said service providing section is configured to hold individual setup information on said service providing section, and said management control section operates said service providing section which holds the individual setup information, based on said individual setup information.

4. The communication terminal according to claim 1, wherein said service providing section is configured to hold individual setup information on said service providing section, and outputs said individual setup information to the communication terminal which operates said service providing section.

5. A communication control method for controlling operation of a communication system which comprises a communication terminal having a plurality of service providing sections configured to terminate a call, receive operation instruction information, and provide a predetermined information service, said communication method comprising:

setting up information by the communication terminal commonly for said service providing sections disposed inside the communication terminal and said service providing sections disposed outside the communication terminal that are connected to the communication terminal, the setup information including an enablement and disablement of a drive mode by a user operation of the communication terminal, and the setup information including information indicating how to control both the service providing sections inside and outside of the communications terminal;

managing said setup information by the communication terminal, wherein when the drive mode is enabled, an incoming voice call is selectively rejected while incoming data calls are accepted based on incoming information from the network identifying incoming calls as one of voice calls and data calls, the incoming call being accepted using said service providing sections disposed outside the communication terminal; and transmitting a call rejection notification to the network when the incoming voice call is rejected.

6. The communication terminal according to claim 1, wherein said management control section is further configured to judge whether the incoming call should be accepted by at least one of the plurality of service providing sections based on whether the at least one of the plurality of service providing sections accepts a voice call or a data call.

7. The communication control method according to claim 5, the method further comprising:

judging whether the incoming call should be accepted by at least one of the plurality of service providing sections based on whether the at least one of the plurality of service providing sections accepts a voice call or a data call.

* * * * *